US012750156B2

(12) United States Patent
Bai et al.

(10) Patent No.: US 12,750,156 B2
(45) Date of Patent: Sep. 29, 2026

(54) COMMUNICATION METHOD, COMMUNICATION DEVICE, ELECTRONIC DEVICE, AND COMPUTER READABLE STORAGE MEDIUM

(71) Applicant: BEIJING XIAOMI MOBILE SOFTWARE CO., LTD., Beijing (CN)

(72) Inventors: Yingshuang Bai, Beijing (CN); Yuanyuan Li, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/027,100

(22) PCT Filed: Sep. 23, 2020

(86) PCT No.: PCT/CN2020/117254
§ 371 (c)(1),
(2) Date: Mar. 18, 2023

(87) PCT Pub. No.: WO2022/061622
PCT Pub. Date: Mar. 31, 2022

(65) Prior Publication Data

US 2024/0031054 A1 Jan. 25, 2024

(51) Int. Cl.
*H04L 1/00* (2006.01)
*H04W 72/1263* (2023.01)

(52) U.S. Cl.
CPC ....... *H04L 1/0004* (2013.01); *H04W 72/1263* (2013.01)

(58) Field of Classification Search
None
See application file for complete search history.

(56) References Cited

U.S. PATENT DOCUMENTS

2002/0126694 A1* 9/2002 Kahola ................. H04L 1/0016 370/465
2008/0225965 A1* 9/2008 Pi ........................... H04B 7/068 714/800

(Continued)

FOREIGN PATENT DOCUMENTS

CN 101483463 A 7/2009
CN 105471543 A 4/2016

(Continued)

OTHER PUBLICATIONS

International Search Report issued in Application No. PCT/CN2020/117254 dated Jun. 21, 2021 with English translation, (4p).

(Continued)

*Primary Examiner* — Nicholas A Jensen
*Assistant Examiner* — Ayodele Lawrence Olubodun
(74) *Attorney, Agent, or Firm* — Arch & Lake LLP; Hao Tan; Shen Wang

(57) ABSTRACT

Communication methods, a communication device, an electronic device, and a computer readable storage medium are provided. One communication method includes: performing, based on an index modulation mode, index modulation on indication information to be sent, by a location of a resource occupied by constellation symbol information in a transmission block, to generate modulated transmission information, where the modulated transmission information includes the constellation symbol information and the indication information.

18 Claims, 3 Drawing Sheets

(56) References Cited

U.S. PATENT DOCUMENTS

| | | | | |
|---|---|---|---|---|
| 2010/0183056 | A1* | 7/2010 | Hoshino | H04B 7/0413 375/295 |
| 2010/0189051 | A1* | 7/2010 | Li | H04L 27/345 375/295 |
| 2013/0286961 | A1 | 10/2013 | Vermani et al. | |
| 2015/0063242 | A1* | 3/2015 | Hirata | H04L 1/0016 370/329 |
| 2016/0105300 | A1* | 4/2016 | Wang | H04L 27/2057 375/308 |
| 2016/0212006 | A1* | 7/2016 | Kim | H04L 27/10 |
| 2017/0289979 | A1* | 10/2017 | Xu | H04L 5/0016 |
| 2018/0006786 | A1* | 1/2018 | Guo | H04L 1/1812 |
| 2020/0296695 | A1* | 9/2020 | Gao | H04L 1/1664 |
| 2020/0374163 | A1* | 11/2020 | Zhao | H04L 5/0094 |
| 2020/0374868 | A1* | 11/2020 | Liang | H04L 1/0026 |
| 2022/0077978 | A1* | 3/2022 | Haghighat | H04L 1/0071 |
| 2022/0385523 | A1* | 12/2022 | Kimura | H04L 27/186 |

FOREIGN PATENT DOCUMENTS

| | | | |
|---|---|---|---|
| CN | 111525978 | A | 8/2020 |
| WO | 2017129128 | A1 | 8/2017 |

OTHER PUBLICATIONS

Notification to Grant Patent issued to Chinese Application No. 202080002246.6 dated Mar. 23, 2022 with English translation, (6p).

* cited by examiner

COMMUNICATION METHOD, COMMUNICATION DEVICE, ELECTRONIC DEVICE, AND COMPUTER READABLE STORAGE MEDIUM

CROSS-REFERENCE TO RELATED APPLICATION

The present application is the U.S. National phase application of International Application No. PCT/CN2020/117254, filed on Sep. 23, 2020, the entire content of which is incorporated herein by reference for all purposes.

TECHNICAL FIELD

The present disclosure relates to the field of communications, and in particular, to communication methods, communication devices, an electronic device, and a computer-readable storage medium.

BACKGROUND

As 5G New Radio (NR) uses increasingly high frequency bands and is limited by antenna and transmission power, uplink coverage hits a bottleneck. The coverage enhancement, for different application scenarios and service requirements, is a topic that deserves further research.

There are many coverage enhancement methods, various types of which focus on the time domain, frequency domain and spatial domain, mainly using the diversity gain of the signal, but also some of them achieve coverage enhancement by improving the accuracy of the channel.

SUMMARY

The present disclosure provides communication methods, communication devices, an electronic device, and a computer-readable storage medium.

In a first aspect of the present disclosure, there is provided a communication method, including: performing, based on an index modulation mode, index modulation on indication information to be sent, by a location of a resource occupied by constellation symbol information in a transmission block, to generate modulated transmission information. The modulated transmission information includes the constellation symbol information and the indication information.

In a second aspect of the present disclosure, there is provided a communication method, including: receiving modulated transmission information from a transmitter, where the modulated transmission information includes constellation symbol information and indication information; and obtaining, based on an index modulation mode, the indication information from the modulated transmission information, according to a location of a resource occupied by the constellation symbol information in a transmission block.

In a third aspect of the present disclosure, there is provided an electronic device, including: a memory, a processor and a computer program stored on the memory and runnable on the processor, where the processor implements the communication method of the first or second aspect when executing the computer program.

In a fourth aspect of the embodiments of the present disclosure, there is provided a non-transitory computer-readable storage medium, having a computer program stored thereon, where the computer program, when executed by a processor, causes the processor to implement the communication method of the first or second aspect.

It should be understood that the foregoing general description and the following detailed descriptions are exemplary and explanatory only and do not limit the present disclosure.

BRIEF DESCRIPTION OF THE DRAWINGS

The accompanying drawings herein are incorporated into and form part of the specification, illustrate embodiments consistent with the present disclosure, and are used to explain the principles of the present disclosure in conjunction with the specification.

DETAILED DESCRIPTION

Figure 1:
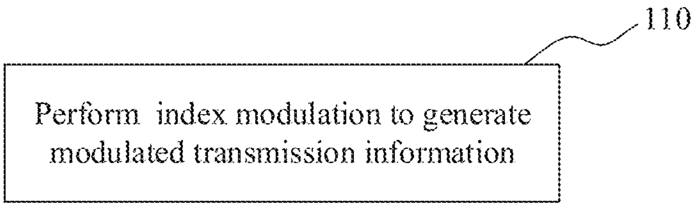
FIG. 1 is a flow chart of a communication method illustrated according to some embodiments.

Embodiments of the present disclosure are described in detail below, and examples of the embodiments are shown in the accompanying drawings. The same or similar reference numerals from beginning to end indicate the same or similar components or components having the same or similar functions. The embodiments described below by reference to the accompanying drawings are exemplary and are intended only to explain the present disclosure and are not to be construed as limiting this application.

When the following description relates to the drawings, unless otherwise indicated, the same numerals in different accompanying drawings indicate the same or similar elements. The implementations described in the following embodiments do not represent all implementations that are consistent with embodiments of the present disclosure. Rather, they are only examples of devices and methods that are consistent with some aspects of embodiments of the present disclosure, as detailed in the appended claims.

It will be understood by those of skill in the art that, unless specifically stated, the singular forms "one," "a/an," "said," and "the/this" as used herein may also include the plural form. It should be further understood that the word "includes" as used in the specification of this disclosure refers to the presence of the described features, integers, steps, operations, components and/or assemblies, but does not exclude the presence or addition of one or more other features, integers, steps, operations, components, assemblies and/or groups thereof.

It should be understood that when a component is referred to as being "connected" or "coupled" to another component, it can be directly connected or coupled to other components, or there can be intermediate components. In addition, "connected" or "coupled" as used herein may include wirelessly connected or wirelessly coupled. The word "and/or" as used herein includes all or any of the units and all combinations of one or more of the associated listed items.

It should also be understood that while the terms “first,” “second,” and “third”, etc. may be employed in embodiments of the present disclosure to describe various kinds of information, such information should not be limited by these terms. These terms are used only to distinguish the same type of information from one another. For example, without departing from the scope of embodiments of the present disclosure, a first element may also be referred to as a second element, and similarly, a second element may also be referred to as a first element. Depending on the context, the words “if” and “assuming that” as used herein may be interpreted as “at the time of . . . ” or “when . . . ” or “in response to . . . ”

Reference throughout this specification to “one embodiment,” “an embodiment,” “an example,” “some embodiments,” “some examples,” or similar language means that a particular feature, structure, or characteristic described is included in at least one embodiment or example. Features, structures, elements, or characteristics described in connection with one or some embodiments are also applicable to other embodiments, unless expressly specified otherwise.

The terms “module,” “sub-module,” “circuit,” “sub-circuit,” “circuitry,” “sub-circuitry,” “unit,” or “sub-unit” may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Among the existing coverage enhancement methods, retransmission is a very straightforward and effective method as far as the time domain is concerned, and the existing mechanisms support a maximum number of 16 retransmissions. As far as the frequency domain is concerned, the coverage enhancement methods using frequency hopping techniques have also been widely studied, mainly with the hope of obtaining diversity gain in the frequency domain. Existing solutions are also available from the perspective of channel estimation to improve the coverage performance by increasing the accuracy of channel estimation. Joint cross-time slot channel estimation is one of the more widely studied methods, which reduces the overhead of Demodulation Reference Signal (DMRS) to some extent, and the joint channel estimation is performed on DMRS in two or more time slots in order to increase the accuracy of channel estimation. In the slow fading channel environment, the accuracy of channel estimation can be improved to some extent without increasing the DMRS density.

The existing retransmission types are divided into two types, i.e., intra time slot (intra-slot) retransmission and inter time slot (inter-slot) retransmission. In intra-slot retransmission scheme, a time slot contains 14 Orthogonal Frequency Division Multiplexing (OFDM) symbols, if retransmitted twice, the same information is transmitted every seven symbols, while, if retransmitted seven times, the same information is transmitted every two symbols, and so on. The inter-slot retransmission means that each retransmission is scheduled for a whole time slot. The retransmission achieves diversity gain in the time domain, but for the intra-slot retransmission scheme, the more times the transmission theoretically requires more reference signals, which will lead to a serious waste of resources. In the inter-slot retransmission scheme, each transmission utilizes an entire time slot and therefore generates a certain delay. In addition, the retransmission is automatically stopped when a time slot edge is encountered, so the actual number of retransmissions may be smaller than the theoretical number of retransmissions. Existing mechanisms also support further transmission across the time slot edge, but when the receiver can decode correctly, the remaining number of retransmissions results in a waste of resources.

The existing frequency-hopping types are also divided into two types, i.e., intra-slot frequency hopping and inter-slot frequency hopping. The intra-slot frequency hopping means that the information within one time slot is transmitted through different frequency bands. The inter-slot frequency hopping refers to the transmission of information using different frequency bands for different time slots. The existing mechanism supports a small number of hopping frequencies and is limited by the bandwidth Part (BWP), so the ideal gain of frequency hopping is not obtained. The intra-slot frequency hopping also requires adding DMRS signals in each hopping frequency. Although the increase in the number of hopping frequencies will result in greater frequency diversity gain, it also causes a waste of resources, as well as a degradation of channel estimation performance if the distribution of DMRS signals is not uniform. Since multiple time slots have to be joined for channel estimation, it will cause some delay. In addition, the method is only applicable to slow fading channels and may lead to degradation of the channel estimation accuracy if the channel environment changes rapidly.

The 5G NR uplink supports Cyclic Prefix Orthogonal Frequency Division Multiplexing (CP-OFDM) and Discrete Fourier Transform-Spread-Orthogonal Frequency Division Multiplexing (DFT-S-OFDM) waveforms, while downlink supports only CP-OFDM waveforms. OFDM as the base waveform has great advantages in terms of high spectrum utilization, good anti-multipath performance and flexible resource allocation. However, OFDM has a high Peak to Average Power Ratio (PAPR) and tends to destroy the orthogonality between subcarriers in highly dynamic scenarios. The 5G NR uplink can use DFT-S-OFDM waveform, the addition of DFT can reduce the PAPR of the system, but the waveform only supports single-layer transmission and the subcarriers within the transmission block remain orthogonal and sensitive to frequency offset.

In the present disclosure, the coverage is enhanced by reducing PAPR from a waveform perspective and the OFDM sensitivity to frequency offset in a highly dynamic environment is also taken into account. In addition, the present disclosure allows sparse transmission in the frequency domain to reduce PAPR and mitigate the effect of Doppler shift, and provides a mechanism to carry additional indication information in order to compensate for the loss caused by the sparse spectrum.

Embodiments of the present disclosure will be described below with reference to the accompanying drawings.

FIG. 1 is a flow chart of a communication method illustrated according to some embodiments.

The communication method shown in FIG. 1 may be a method performed by a control device or a processing device located in or near the transmitter side. The transmitter may be a base station or a terminal. In the case where the transmitter is a base station, the terminal may be the receiver, and vice versa. However, this is only exemplary, and embodiments of the present disclosure are not limited thereto.

The terminal as well as the base station may be devices included in a wireless communication system, and the wireless communication system may include a plurality of terminals and a plurality of base stations.

The terminal may be a device that provides voice and/or data connectivity to a user. The terminal may communicate with one or more core networks via a Radio Access Network (RAN), and the terminal may be an IoT terminal, such as a sensor device, and a cell phone (or "cellular" phone), or may be a computer with an IoT terminal, for example, a fixed, portable, pocket-sized, handheld, computer-built, or vehicle-mounted device. For example, it may be a Station (STA), subscriber unit, subscriber station, mobile station, mobile, remote station, access point, remote terminal, access terminal, user terminal, user agent, or User Equipment (UE). In addition, the terminal may also be a device of an unmanned aerial vehicle. Moreover, the terminal can also be a transmission control unit, for example, an electronic control unit with wireless communication functions, or a wireless communication device external to the electronic control unit.

The base station may be a network-side device in the wireless communication system. The wireless communication system may be the 4th generation mobile communication (4G) system, also known as a Long Term Evolution (LTE) system. Alternatively, the wireless communication system may be a 5G system, also known as a New Radio (NR) system or 5G NR system, or may be the next generation of the 5G system.

The base station can be an evolved base station (eNB) as used in the 4G system. Alternatively, the base station may be a base station (gNB) with a centralized distributed architecture employed in the 5G system. When a base station adopts a centralized distributed architecture, it usually includes a Central Unit (CU) and at least two Distributed units (DUs). The CU is equipped with the protocol stack of Packet Data Convergence Protocol (PDCP) layer, Radio Link Control (RLC) layer, and Media Access Control (MAC) layer. The DU is equipped with a physical (PHY) layer protocol stack. The specific implementations of the base station are not limited by the embodiments of the present disclosure.

A wireless connection may be established between the base station and the terminal via a wireless air interface. In various implementations, the wireless air interface is a wireless air interface based on the 4th generation mobile communication network technology (4G) standard, or the 5th generation mobile communication network technology (5G) standard, for example, the wireless air interface is a new radio. Alternatively, the wireless air interface may also be a wireless air interface based on the next generation mobile communication network technology standard of 5G.

In addition, the wireless communication system may also contain network management equipment.

The base station is connected to the network management equipment. The network management equipment may be core network equipment in the wireless communication system, for example, the network management equipment may be a Mobility Management Entity (MME) in an Evolved Packet Core (EPC). Alternatively, the network management equipment may be other core network equipment such as a Serving Gate Way (SGW), Public Data Network Gate Way (PGW), Policy and Charging Rules Function (PCRF), or Home Subscriber Server (HSS), etc. The implementation form of the network management equipment is not limited by the embodiments of the present disclosure.

Referring to FIG. 1, in step 110, index modulation may be performed to generate modulated transmission information. Specifically, the index modulation may be performed, based on an index modulation mode, on the indication information to be sent, by a location of a resource occupied by constellation symbol information in a transmission block, to generate the modulated transmission information. Here, the transmission information may include the constellation symbol information and the indication information.

According to embodiments of the present disclosure, the index modulation mode may be adaptively determined based on a quality condition of a communication with a receiver. For example, the transmitter may determine (or select) the index modulation mode based on the quality condition of the communication with the receiver. For example, the index modulation mode may be adaptively determined (or selected) based on the current coverage circumstance and the wireless channel environment such that it maximizes the utilization of the spectrum while satisfying the communication quality requirements. This will be described in detail subsequently with reference to step 230 of FIG. 2.

According to embodiments of the present disclosure, the index modulation mode may include: an occupancy rule for the location of the resource in the transmission block, and/or a mapping relationship between the location of the resource occupied by the constellation symbol information in the transmission block and corresponding indication information. According to embodiments of the present disclosure, the occupancy rule for the location of the resource in the transmission block provides the number of resources randomly selected for transmission of the constellation symbol information from the total number of resources contained in each transmission block. According to embodiments of the present disclosure, the mapping relationship between the location of the resource occupied by the constellation symbol information in the transmission block and the corresponding indication information may reflect the correspondence of the indication information to the resource location of the constellation symbol information in the transmission block. The indication information may include index bit information consisting of one or more bits. That is, in the index modulation mode, the mapping relationship between the location of the resource occupied by the constellation symbol information in the transmission block and the corresponding indication information may be used to determine the index bit information consisting of one or more bits. In the following description, the indication information may be used interchangeably with the index bit information.

According to embodiments of the present disclosure, the location of the resource occupied by the constellation symbol information in the transmission block may be the location of a frequency domain resource in the transmission block, i.e., sparse transmission may be performed in the frequency domain according to the embodiments of the present disclosure. However, this is not limited by the embodiments of the present disclosure. For example, the location of the resource occupied by the constellation symbol information in the transmission block may also be the location of a time domain resource in the transmission block, or the location of a combination of time-frequency resources in the transmission block. That is, the resource in the transmission block may be a frequency domain resource (e.g., a subcarrier), a time domain resource (e.g., a symbol), or a combination of a frequency domain resource and a time domain resource (e.g., a Resource Block (RB) or a Resource Element (RE)). In the case of sparse transmission over time domain resources, the interference between symbols can be reduced in transmission. Meanwhile, in this time domain sparse transmission, the cyclic prefix (CP) of OFDM symbols can be removed, because the time domain sparse transmission itself achieves the purpose of anti-symbol interference. When time-frequency resources are also used to achieve sparse transmission (i.e., using RB or RE within the transmission block), not only is it possible to reduce PAPR in the transmission block dimension, but also to achieve the effect of reducing inter-symbol interference, and at the same time, it is possible to transmit a larger amount of data indication information due to the increased amount of candidate resources.

According to embodiments of the present disclosure, the index modulation mode is notified to the receiver via Physical Downlink Control Channel (PDCCH) or Physical Uplink Control Channel (PUCCH). That is, the transmitter and receiver can be informed of the index modulation mode before modulation/demodulation takes place. This will be described in detail subsequently with reference to step 250 of FIG. 2.

In another embodiment, the index modulation mode may be known in advance by the transmitter and receiver. For example, the index modulation mode may be configured by the equipment provider before the terminal leaves the factory, or may be specified through a communication protocol. The transmitter and receiver send and receive the transmission information directly according to the known index modulation mode. The transmitter and receiver can also perform the determination of the index modulation mode separately according to the pre-configured uniform determination rules used for the index modulation mode, based on the communication quality between the transmitter and the receiver, so as to obtain a consistent result for selecting the index modulation mode and achieve uniform index modulation/demodulation.

In one embodiment, the index modulation mode may include an occupancy rule for the location of the resource in the transmission block, and/or a mapping relationship between the location of the resource occupied by the constellation symbol information in the transmission block and corresponding indication information. In some examples, what is included in the notified index modulation mode may be adaptively changed based on the communication configuration. In one embodiment, the occupancy rule for the location of the resource in the transmission block may be pre-agreed between the transmitter and the receiver, or may be known from the communication protocol supported by the transmitter and the receiver, or may have been previously determined by the transmitter and sent to the receiver, in which case the notified index modulation mode may only include the mapping relationship between the location of the resource occupied by the constellation symbol information in the transmission block and the corresponding indication information. In other embodiments, the mapping relationship between the location of the resource occupied by the constellation symbol information in the transmission block and the corresponding indication information may be pre-agreed between the transmitter and the receiver, or may be known from the communication protocol supported by the transmitter and the receiver, or may have been previously determined by the transmitter and sent to the receiver, in which case the notified index modulation mode may include only the occupancy rule for the location of the resource in the transmission block.

As described above, each transmission block contains resources that may be subcarriers, symbols, RBs, or REs. In this case, the location of the resource occupied by the constellation symbol information in the transmission block may refer to: the subcarrier location of the constellation symbol information in the transmission block, the symbol location of the constellation symbol information in the transmission block, or the RB location or RE location of the constellation symbol information in the transmission block.

In the following description, for ease of description, it is illustrative and described primarily in terms of subcarriers as resources contained in each transmission block; however, this is not limited by the embodiments of the present disclosure, and other resources that can transmit information are also feasible. Accordingly, in the following description, as exemplary, the occupancy rule for the location of the resource in the transmission block specify the number of resources randomly selected from the total number of resources contained in each transmission block for transmission of the constellation symbol information. According to embodiments of the present disclosure, the mapping relationship between the location of the resource occupied by the constellation symbol information in the transmission block and the corresponding indication information may reflect the correspondence of the indication information to the resource location of the constellation symbol information in the transmission block.

The peak power of the system is generated by the superposition of multiple subcarriers with the same or similar phase at the same moment, and the more subcarriers are superposed, the higher the peak power of the system and the higher the PAPR, so sparse transmission in the frequency domain can be performed to reduce the PAPR. For example, based on the occupancy rule for the location of the resource in the transmission block, it can be specified that among L subcarriers contained in each transmission block, N subcarriers are selected to transmit information (e.g., the constellation symbol information), and the remaining L-N subcarriers are used to send only "0". It will be understood that said "the remaining L-N subcarriers are used to send only "0"" is only exemplary and that the remaining L-N subcarriers may also be used to send other information, e.g., low-energy information.

In addition, based on the mapping relationship between the location of the resource occupied by the constellation symbol information in the transmission block and the corresponding indication information, the location of the subcarrier used to transmit the information can be used to transmit the indication information (e.g., indexed bits), thus requiring the same mapping relationship (e.g., an index mapping table) at both the transmitting and receiving ends to determine the indication information that is modulated in the transmission information by indexing the location of the resource occupied by the constellation symbol information. The transmission of the indication information will compensate for the loss of spectral efficiency due to the sparsity of the carrier. This transmission reduces the PAPR to some extent, and although there is a large Doppler shift in the highly dynamic transmission environment, the interference of the subcarriers sending "0" to the subcarriers transmitting the information is almost negligible, and thus, this transmission resists the effect of partial frequency offset on the orthogonality of the subcarriers.

The determined index modulation mode can be used to transmit the constellation symbol information and indication information (e.g., the index bit information). In one embodiment, when N subcarriers are selected from L subcarriers to transmit information (e.g., the constellation symbol information), the number of index bits that can be transmitted is $$\lfloor \log_2 C_L^N \rfloor$$

bits (⌊•⌋ denotes the rounding symbol) for a total of $$C_L^N$$

transmissions ( $$(C_L^N$$

denotes the number of combinations to select N subcarriers from L subcarriers).

Figure 2:
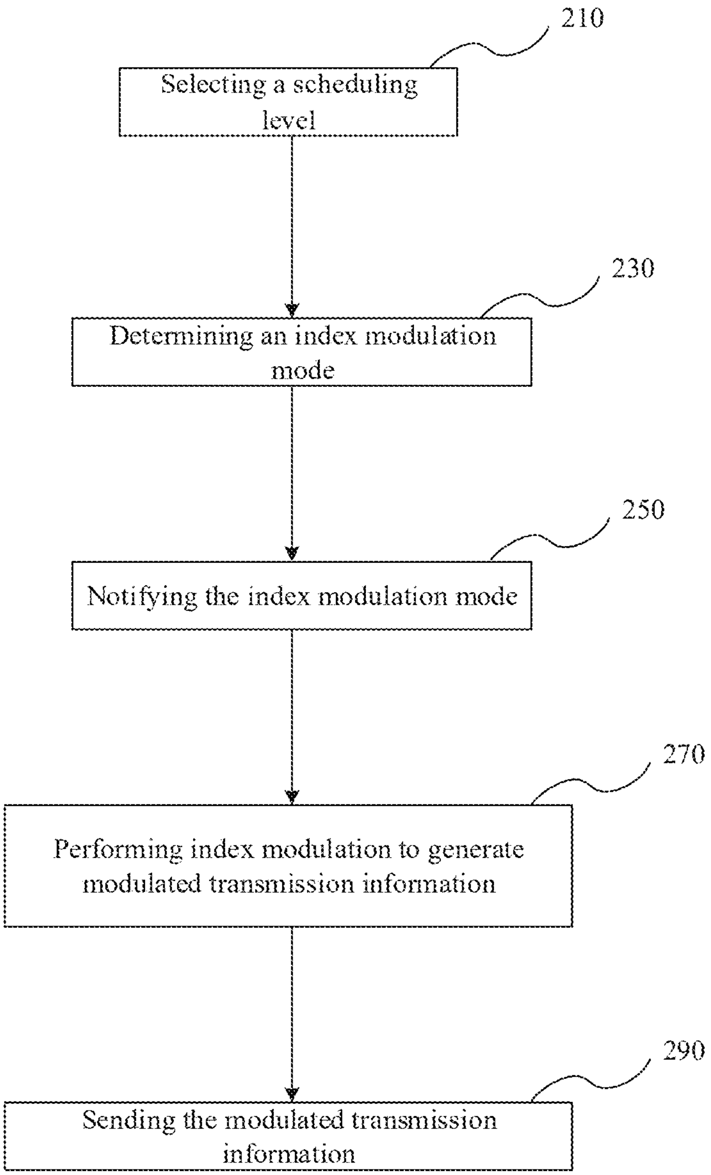
FIG. 2 is a detailed flow chart of the communication method illustrated according to some embodiments.

The steps of the communication method illustrated in FIG. 1 are only exemplary, which are not limited by the embodiments of the present disclosure and may, for example, include additional steps. As shown in FIG. 2, a detailed flow chart of the communication method illustrated according to the some embodiments is shown.

Referring to FIG. 2, in step 210, a transmission resource scheduling level maybe selected (or determined). Specifically, the transmission resource scheduling level may be freely selected, and the selected transmission resource scheduling level corresponds to the granularity or dimensionality of a division of resources contained in each transmission block. That is, the corresponding information can be transmitted at the selected transmission resource scheduling level. In some embodiments, similar to the above description, the selected transmission resource scheduling level may be a subcarrier level, a symbol level, an RB level, or an RE level. In one embodiment, the transmission resource scheduling level may be selected based on the current coverage circumstance, e.g., a dense transmission resource scheduling level (e.g., a subcarrier level) may be selected to carry the indication information with a larger amount of data when the coverage circumstance is good, and a sparse transmission resource scheduling level (e.g., an RB level) may be selected to further reduce the PAPR when the coverage circumstance is poor. However, this is only exemplary, and the corresponding transmission resource scheduling level can also be selected according to the actual conditions of the communication environment. In this disclosure, the subcarrier level is described as an example for the sake of description.

In step 230, the index modulation mode may be determined. Step 230 of FIG. 2 may be the same operation as step 110 of FIG. 1. As described with reference to step 110 of FIG. 1, the index modulation mode may be determined adaptively based on the quality condition of the communication with the receiver. In one embodiment, the index modulation mode may be adaptively determined based on a parameter indicative of communication quality or channel quality (e.g., measurement parameters of communication quality). For example, Reference Signal Receiving Power (RSRP), Reference Signal Receiving Quality (RSRQ), and/or Signal to Interference plus Noise Ratio (SINR) and other parameters can be applied to indicate the communication quality. In one embodiment, the index modulation mode may be determined based on the result of comparing the measurement parameter of the communication quality with one or more thresholds. For example, when the RSRP is low (e.g., below a specific threshold), the number N of subcarriers selected from the L subcarriers may be increased or decreased, depending on the determination logic or determination rules in the different communication systems. It will be understood that the measurement parameter of the communication quality can be compared to one or more thresholds to determine the index modulation mode. For example, an upper threshold and a lower threshold may be set, and a different or the same number of subcarriers may be selected from the L subcarriers in case the measurement parameter is higher than the upper threshold, in case the measurement parameter is lower than the lower threshold, or in case the measurement parameter is between the lower threshold and the upper threshold. That is, the value of N may be different or the same when the measurement parameter falls in different value ranges.

In step 250, the receiver may be notified of the index modulation mode determined in step 230 either implicitly or explicitly. For example, additional bits may be utilized in the PDCCH or PUCCH to notify the determined index modulation mode.

As mentioned above, N subcarriers are selected from the L subcarriers to transmit the constellation symbol information, and thus there can be $$C_L^N$$

types of transmission method, among which $$2^{\lfloor log_2 C_L^N \rfloor}$$

types of transmission method can be selected since "0" and "1" are transmitted, and the additional bits corresponding to the selectable transmission method can be used to notify the receiver of the index modulation mode determined in step 230, so that the receiver can first blindly check the transmission block according to the same transmission resource scheduling level as that of the transmitter, and thus determine the location of the resource carrying the constellation symbol information. Then, the indication information (e.g., the index bit information) is obtained by performing index modulation on the received transmission information according to the same index modulation mode as that of the transmitter, for example, the same index mapping relationship and/or resource location occupancy rule.

In embodiments of the present disclosure, information related to the determined index modulation mode can be carried in the PDCCH or PUCCH to notify the receiver of the determined index modulation mode. For example, assuming that each transmission block can contain 4 subcarriers, the maximum number of index modulation modes that can be employed is 4. Therefore, only 2 additional bits of information are needed to notify the receiver of the current index modulation mode, and the 2 bits of information can be carried in the PDCCH or PUCCH. For example, when the transmitter is a base station (e.g., gNB), the information related to the determined index modulation mode can be carried in the PDCCH to notify the receiver (e.g., UE) of the index modulation mode currently determined. For example, when the transmitter is a terminal (e.g., UE), the information related to the determined index modulation mode may be carried in the PUCCH to notify the receiver (e.g., gNB) of the index modulation mode currently determined. It will be understood that step 250 may be omitted when a particular index modulation mode is pre-agreed between the transmitter and receiver, or when the index modulation mode can be directly known from the supported protocols, etc.

Figure 3:
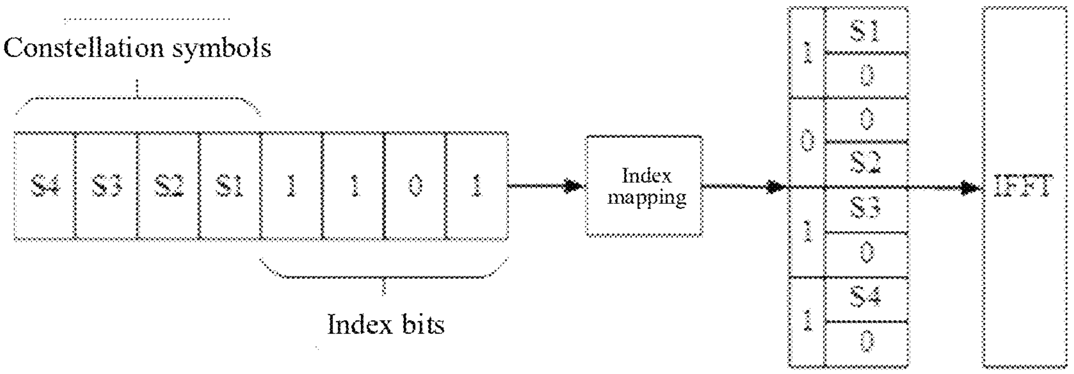
FIG. 3 is a schematic diagram of an index modulation mode illustrated according to some embodiments.

FIG. 3 illustrates an example of the determined index modulation mode.

Referring to FIG. 3, after modulation by Binary Phase Shift Keying (BPSK) modulation mode, the constellation symbols S1 to S4 to be transmitted can be obtained. In the determined index modulation mode, the occupancy rule for the location of the resource in the transmission block can be L=2 and N=1, i.e., every two subcarriers can be defined as one transmission block. In this case, the determined index modulation mode can mean that every two subcarriers can transmit 1 bit of index information and 1 bit of constellation symbol information and under this occupancy rule there will be no waste of spectrum resources. When the index bit is "1", the first subcarrier is used to transmit the constellation symbol information; and when the index bit is "0", the second subcarrier is used to transmit the constellation symbol information. After receiving the transmission information, the receiver can first blindly check the transmission block according to the same transmission resource scheduling level as that of the transmitter to determine the location of the resource carrying the constellation symbol information. Then, the indication information, e.g., the index bit, can be obtained by performing index modulation on the received transmission information according to the same index modulation mode as that of the transmitter, which will be described in detail subsequently with reference to FIG. 5.

Referring back to FIG. 2, in step 270, the index modulation of the indication information to be sent may be performed by the location of the resource occupied by the constellation symbol information in the transmission block based on the index modulation mode determined in step 230, in order to generate the modulated transmission information. For example, the modulated transmission information may be a piece of transmission information for each transmission block shown in FIG. 3. For example, the transmission information in the first transmission block may be "S1, 0", the transmission information in the second transmission block may be "0, S2", the transmission information in the third transmission block may be "S3, 0", and the transmission information in the fourth transmission block may be "S4, 0".

In step 290, the modulated transmission information can be sent at the determined transmission resource scheduling level using the determined index modulation mode. For example, as described above, the corresponding information can be sent in each transmission block using subcarriers according to the "L=2 and N=1" index modulation mode.

It will be understood that the steps of the communication method shown in FIG. 2 are only exemplary, which are not limited by the embodiments of the present disclosure and may, for example, include fewer or more steps. For example, step 210 may be omitted when the transmission resource scheduling level is pre-agreed between the transmitter and the receiver. For example, the communication method illustrated in FIG. 2 may also include the step of transmitting additional information (not shown) using the indication information (index bit information).

Based on the amount of data of indication information (e.g., the number of bits of the index bits) that the transmitter and the receiver are able to transmit, the additional information to be transmitted by the indication information may be agreed in advance between the transmitter and the receiver. For example, when there are a lot of bits in the indication information, the indication information can be used for retransmission and/or some of the bits in the indication information can be used for checking. The indication information may also be used to transmit data information and control signaling. For example, the indication information can be used to transmit the control signaling when the number of bits of the transmitted indication information is small.

In one embodiment of the present disclosure, the communication method described in FIG. 1 or FIG. 2 may further include (not specifically shown in the accompanying drawings): performing, in response to the number of bits of the indication information being equal to or greater than the number of bits of the constellation symbol information, retransmission on the constellation symbol information using the indication information.

Referring to FIG. 3, the index bits of the indication information to be transmitted are "1011" and the constellation symbol information to be transmitted are "S1-S4", and if the constellation symbol information is retransmitted using the indication information (the number of bits of the constellation symbol information and the number of bits of the index bits transmitted in each transmission block are the same, i.e., 1 bit of the constellation symbol information and 1 bit of index bits), the numerical information corresponding to the constellation symbol information before BPSK modulation can be considered as "1011". In case of retransmission, the index bits demodulated at the receiver can correspond to the constellation symbol information.

In one embodiment of the present disclosure, the communication method described in FIG. 1 or FIG. 2 may further include (not specifically shown in the accompanying drawings): performing, in response to the number of bits of the indication information being greater than the number of bits of the constellation symbol information, retransmission on the constellation symbol information using a first portion of the bits of the indication information; and carrying a check bit for the location of the resource using a second portion of the bits of the indication information. This will be described in detail below with reference to FIG. 4.

Figure 4:
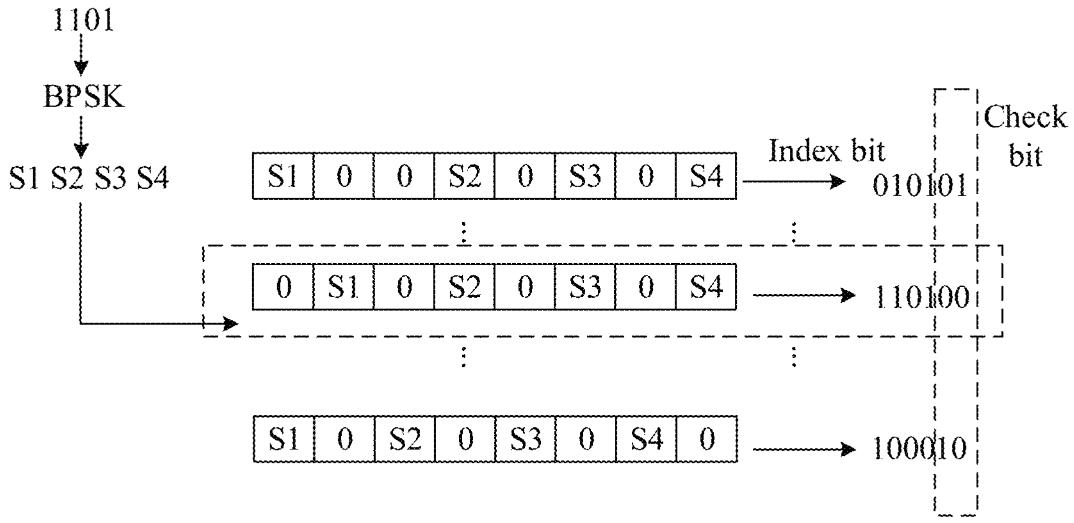
FIG. 4 is a schematic diagram of retransmission and checking bits illustrated according to some embodiments.

FIG. 4 illustrates a schematic diagram of the retransmission and checking bits.

In FIG. 4, the index modulation mode with L=8 and N=4 can be used and the constellation symbols can be obtained after BPSK modulation. In this case, 4 subcarriers can be selected from 8 subcarriers to transmit the constellation symbol information, i.e., 4 bits of the constellation symbol information and 6 bits of the indication information can be transmitted (the number of bits of the index bits transmitted per transmission block is more than the number of bits of the constellation symbol information). The existing retransmission mechanism has a certain delay, so it is possible to use 4 bits of the 6-bit indication information for one retransmission and to use the remaining 2 bits as check bits to check the location of the subcarrier used to transmit information.

Referring to FIG. 4, "1101" can be modulated into the constellation symbols S1-S4 to be transmitted after BPSK modulation, and there can be various (e.g., $$(\text{e.g., } C_8^4)$$

transmission methods for the transmission of the constellation symbol information by the selection of 4 subcarriers from 8 subcarriers. For example, "S1, 0, 0, S2, 0, S3, 0, S4" can indicate that the first subcarrier, the fourth subcarrier, the sixth subcarrier and the eighth subcarrier are occupied to transmit the constellation symbol information S1-S4, respectively, and the index bits of the indication information corresponding to the mapping relationship between the location of the resource occupied by the constellation symbol information and the corresponding indication information is "010101". The principles and processes of performing index modulation using the remaining index modulation modes are similar to those disclosed above and repeated descriptions are omitted for brevity.

In the case of using the indication information for retransmission and checking, the transmitter can send the modulated transmission information in the form of "0, S1, 0, S2, 0, S3, 0, S4", the receiver can first determine the locations of the subcarriers, and then obtain the corresponding index bits "110100" according to the mapping relationship (e.g., index mapping table) between the determined locations and the index bits. Here, the high four bits "1101" can be a retransmission of the constellation symbol information; and the low two bits "00" can be the check bits, which are used to check the locations of the subcarriers for transmitting information, in order to ensure the reliability of the transmission.

In embodiments of the present disclosure, the number of bits available for check bits can be determined based on the number of bits of the index bits included in the indication information, and thus the check method can be predetermined. In addition, the same check method can be predefined in the transmitter and the receiver.

Although it is described with reference to FIG. 4 that, in the case of a large number of bits of the indication information, a first portion of bits of the indication information may be utilized for retransmission and a second portion of bits of the indication information may be utilized for checking, the present disclosure is not limited thereto. For example, a second portion of bits or other portions of bits of the indication information may also be utilized for other information (e.g., signaling messages).

As described above, a data message or control signaling can be transmitted using the index bits in the indication information, for example, Radio Resource Control (RRC) messages, Uplink Control Information (UCI) or Downlink Control Information (DCI). That is, the indication information may be used to transmit the data message or control signaling. In some examples, the indication information may be used to transmit the data message or control signaling in response to the number of bits in the indication information being less than the number of bits in the constellation symbol information. In other words, when the number of bits of the index bits in the indication information is less than the number of bits of the constellation symbol information, the number of bits of the index bits is less than sufficient for retransmission of the constellation symbol information. In this case, the indication information can be used to transmit other messages (e.g., data messages or control signaling).

In one embodiment, the data message or control signaling may include at least one of: channel state information, or information associated with retransmission.

In one embodiment, the indication information can be used to transmit the channel state information for PDCCH/PUCCH.

In one embodiment, the information associated with retransmission may include the transmission status of the retransmission, e.g., the number of retransmissions, continuation of retransmissions, termination of retransmission, etc. Due to the setting of the frame structure and the asymmetry of the uplink and downlink resources, the retransmissions often skip out automatically at the edge of the time slots, which may cause that the actual number of retransmissions is less than the theoretical number of retransmissions. In addition, in the case that the existing mechanism may support skipping the time slot edge, the retransmission can be terminated early to avoid resource waste when the receiver can decode correctly, so the indication information can be used for Physical Downlink Shared Channel (PDSCH)/Physical Uplink Shared Channel (PUSCH) to inform the receiver (e.g., gNB or UE) of the current transmission status to confirm whether to continue retransmission or to terminate it.

The use of indication information for retransmission, checking (or verification), or transmission of data messages or control signaling described above is only exemplary, and embodiments of the present disclosure are not limited thereto, and the indication information may be used to transmit other desired information.

Figure 5:
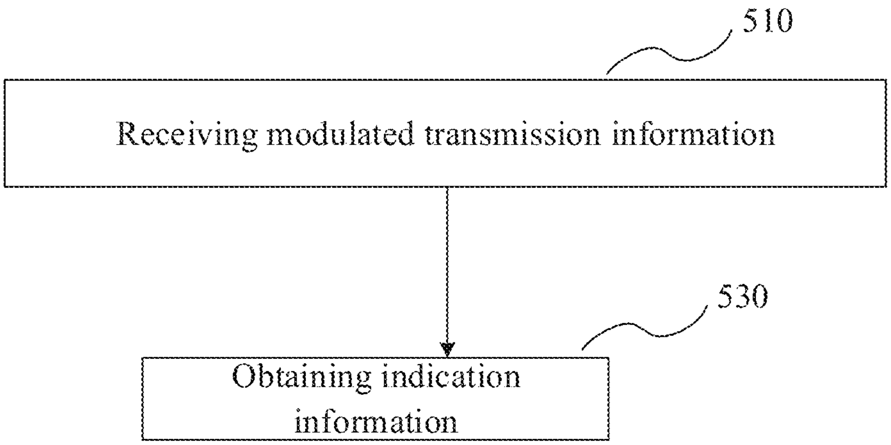
FIG. 5 is a flow chart of another communication method illustrated according to some embodiments.

FIG. 5 shows a flow chart of another communication method illustrated according to some embodiments.

The communication method shown in FIG. 5 may be a method performed by a control device or a processing device located in or near the receiver side. The receiver may be a base station or a terminal. In the case where the receiver is a base station, the terminal may be the transmitter, and vice versa. However, this is only exemplary, and embodiments of the present disclosure are not limited thereto.

Referring to FIG. 5, in step 510, the receiver, for example, may receive modulated transmission information from a transmitter. According to embodiments of the present disclosure, the transmission information may include constellation symbol information and indication information. As described above, the indication information may include index bit information consisting of one or more bits.

In step 530, the indication information (i.e., index bit information) is obtained, based on the index modulation mode, from the transmission information, according to a location of a resource occupied by the constellation symbol information in a transmission block. The index modulation mode is adaptively determined based on a quality condition of a communication with the transmitter. In some examples, the index modulation mode may be determined by the receiver itself based on the network conditions, e.g., both the receiver and the transmitter agree on the same network condition and the index modulation mode associated with that network condition, and then each of the receiver and the transmitter determines the same index modulation mode. In some examples, the index modulation mode may be received from the transmitter, for example, as described with reference to FIG. 2, the transmitter may inform the receiver of the index modulation mode determined after the transmitter has adaptively determined the index modulation mode based on the quality condition of the communication with the receiver, and then the receiver may perform demodulation based on the index modulation mode received from the transmitter to obtain the index bits in the indication information. For example, the receiver may first blindly check the transmission block according to the same transmission resource scheduling level as that of the transmitter, so as to determine the location of the resource carrying the constellation symbol information within the transmission block. Then, index demodulation of the received transmission information is performed based on the determined resource location according to the same index modulation mode as that of the transmitter to obtain the indication information. In embodiments of the present disclosure, the index modulation mode may be obtained from the transmitter via PDCCH or PUCCH. The PDCCH or PUCCH carries information related to the index modulation mode, and the PDCCH may be received when the receiver is a terminal (e.g., a UE), and the PUCCH may be received when the receiver is a base station (e.g., a gNB).

The index modulation mode, similarly to that described with reference to FIGS. 1 and 2, includes: an occupancy rule for the location of the resource in the transmission block, and/or a mapping relationship between the location of the resource occupied by the constellation symbol information in the transmission block and corresponding indication information. The resource contained in each transmission block may include one of: a subcarrier, a symbol, an RB, or an RE. For the sake of brevity, in the following description, the subcarrier is mainly described as an example.

Referring to FIG. 3, the location of the resource occupied by the constellation symbol information can be detected in a group of two subcarriers (one transmission block) according to the index modulation mode, in order to obtain the index bits of the indication information. For example, when in the first group of subcarriers the energy of the first subcarrier is detected by the receiver as greater than the energy of the second subcarrier (the energy of the subcarrier not transmitting the constellation symbol information is smaller because it transmits only "0"), it can be determined that the constellation symbol information S1 is transmitted using the first subcarrier, that is, the location of the subcarrier transmitting the constellation symbol information S1 is determined, and therefore, according to the index modulation mode, it can be determined that such a constellation symbol information S1 occupying the first subcarrier location can correspond to the index bit "1", and similarly the other transmitted index bits "0", "1", and "1" can be demodulated respectively. Other similar ways can also be used to obtain the index bits in the indication information according to the index modulation mode, and the embodiments of the present disclosure are not specifically limited in this regard.

It will be understood that the steps of the communication method shown in FIG. 5 are only exemplary and embodiments of the present disclosure are not limited thereto.

In some examples, the communication method shown in FIG. 5 may further include: selecting a transmission resource scheduling level. The selected transmission resource scheduling level corresponds to granularity or dimension of a division of resources contained in each transmission block. The granularity or dimensionality of the division of the resources may be a subcarrier level, a symbol level, an RB level, or and RE level. However, this is only exemplary and the present disclosure is not limited thereto.

In some examples, the communication method of FIG. 5 may further include: performing a corresponding operation based on the demodulated indication information.

In one embodiment, in response to the number of bits of the indication information being equal to or greater than the number of bits of the constellation symbol information, the indication information corresponds to retransmitted content of the constellation symbol information. In this case, the index bits obtained by index demodulation can be used by the receiver to ensure the correct transmission of the constellation symbol information.

In one embodiment, in response to the number of bits of the indication information being greater than the number of bits of the constellation symbol information, a first portion of the bits of the indication information corresponds to retransmitted content of the constellation symbol information; and the location of the resource is verified using a second portion of the bits of the indication information. In this case, the receiver can not only ensure the correct transmission of the constellation symbol information, but also check the resource location (e.g., the location of the subcarrier) to ensure the reliability of the transmission.

In one embodiment, the indication information may be used to transmit a data message or control signaling. For example, in response to the number of bits of the indication information being less than the number of bits of the constellation symbol information, a corresponding operation is performed based on the data message or control signaling transmitted by the indication information. In one embodiment, the data message or control signaling includes at least one of: channel state information, or information associated with retransmission.

When a time slot edge is encountered, the receiver can determine that the retransmission needs to be continued, based on the data message or control signaling transmitted by the indication information, so that the retransmission does not automatically skip out to ensure the correct transmission of the information. When the receiver can already decode correctly, the receiver can determine that an early termination of the retransmission is required based on the data message or control signaling transmitted by the indication information, so that the retransmission can be terminated early to avoid wasting resources.

In the communication method described with reference to FIGS. 1 to 5, the sparse transmission can be adaptively performed in the frequency domain, and the index bits in the indication information can be used for retransmission or transmission of other important information, which can efficiently use the spectrum resources and ensure the reliability of transmission.

Figure 6:
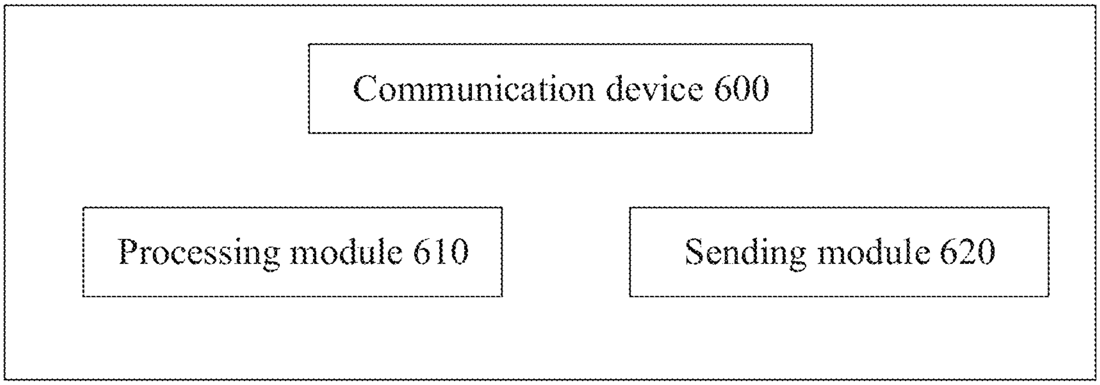
FIG. 6 is a block diagram of a communication device illustrated according to some embodiments.

FIG. 6 is a block diagram of a communication device 600 illustrated according to some embodiments.

Referring to FIG. 6, the communication device 600 may include a processing module 610 and a sending module 620. The communication device 600 may perform the communication methods described with reference to FIG. 1 and FIG. 2 that are performed at the transmitter side.

In one example, the processing module 610 may be configured to perform, based on an index modulation mode, index modulation on indication information to be sent, by a location of a resource occupied by constellation symbol information in a transmission block, to generate modulated transmission information, where the modulated transmission information include the constellation symbol information and the indication information. The sending module 620 may be configured to send the modulated transmission information.

According to embodiments of the present disclosure, the index modulation mode is adaptively determined based on a quality condition of a communication with a receiver. The index modulation mode may be notified to a receiver via PDCCH or PUCCH. The index modulation mode may include: an occupancy rule for the location of the resource in the transmission block, and/or a mapping relationship between the location of the resource occupied by the constellation symbol information in the transmission block and corresponding indication information. The indication information may include index bit information consisting of one or more bits.

In one example, the processing module 610 may be configured to select (or determine) a transmission resource scheduling level. The selected transmission resource scheduling level corresponds to granularity or dimensionality of a division of resources contained in each transmission block. The resource includes one of: a subcarrier, a symbol, an RB, or an RE.

The processing module 610 may perform index modulation on the constellation symbol information and the indication information, and transmit them by controlling the sending module 620.

In one example, the processing module 610 may be configured to control the sending module 620 to perform retransmission on the constellation symbol information using the indication information, in response to the number of bits of the indication information being equal to or greater than the number of bits of the constellation symbol information.

In one example, the processing module 610 may be configured to control the sending module 620 to: perform retransmission on the constellation symbol information using a first portion of the bits of the indication information, in response to the number of bits of the indication information being greater than the number of bits of the constellation symbol information; and/or carry a check bit for the location of the resource using a second portion of the bits of the indication information, in response to the number of bits of the indication information being greater than the number of bits of the constellation symbol information.

In one example, the indication information may be used to transmit a data message or control signaling. For example, the indication information is used to transmit the data message or control signaling in response to the number of bits of the indication information being less than the number of bits of the constellation symbol information. In some examples, the processing module 610 may be configured to control the sending module 620 to transmit the data message or control signaling using the indication information, in response to the number of bits of the indication information being less than the number of bits of the constellation symbol information. The data message or control signaling may include at least one of: channel state information; or information associated with retransmission.

The communication device 600 shown in FIG. 6 is only exemplary, and embodiments of the present disclosure are not limited thereto; for example, the communication device 600 may also include more modules to perform additional operations, or may combine fewer modules to perform various operations.

Figure 7:
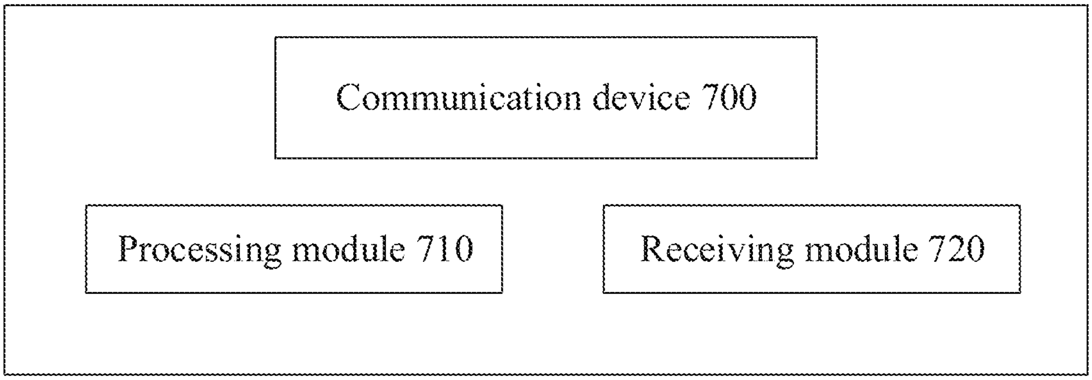
FIG. 7 is a block diagram of another communication device illustrated according to some embodiments.

FIG. 7 is a block diagram of a communication device 700 illustrated according to some embodiments.

Referring to FIG. 7, the communication device 700 may include a processing module 710 and a receiving module 720. The communication device 700 may perform the communication method described with reference to FIG. 5 that is performed at the receiver side.

In one example, the receiving module 720 may be configured to receive modulated transmission information from a transmitter, where the modulated transmission information includes constellation symbol information and indication information.

In one embodiment, the processing module 710 may be configured to obtain, based on an index modulation mode, the indication information from the modulated transmission information, according to a location of a resource occupied by the constellation symbol information in a transmission block. According to embodiments of the present disclosure, the index modulation mode may be adaptively determined based on a quality condition of a communication with the transmitter. The resource may include one of: a subcarrier, a symbol, an RB, or an RE. The indexed modulation mode may include: an occupancy rule for the location of the resource in the transmission block, and/or a mapping relationship between the location of the resource occupied by the constellation symbol information in the transmission block and corresponding indication information. The indication information may include index bit information consisting of one or more bits.

In one embodiment, the index modulation mode is obtained from the transmitter via PDCCH or PUCCH. For example, the receiving module 720 may receive PDCCH or PUCCH, where the PDCCH or PUCCH carries information related to the index modulation mode. In this case, the processing module 710 may be configured to obtain the index modulation mode from the PDCCH or PUCCH. For example, the processing module 710 may determine the index modulation mode by decoding it.

In one embodiment, the processing module 710 may be configured to select a transmission resource scheduling level. The selected transmission resource scheduling level corresponds to granularity or dimensionality of a division of resources contained in each transmission block.

In one embodiment, the processing module 710 may be configured to determine, in response to the number of bits of the indication information being equal to or greater than the number of bits of the constellation symbol information, that the indication information corresponds to retransmission content of the constellation symbol information.

In one embodiment, the processing module 710 may be configured to determine, in response to the number of bits of the indication information being greater than the number of bits of the constellation symbol information, that a first portion of the bits of the indication information corresponds to retransmitted content of the constellation symbol information; and/or check, in response to the number of bits of the indication information being greater than the number of bits of the constellation symbol information, the location of the resource using a second portion of the bits of the indication information.

In one embodiment, the indication information may be used to transmit a data message or control signaling. In this case, the processing module 710 may be configured to perform, in response to the number of bits of the indication information being less than the number of bits of the constellation symbol information, a corresponding operation based on the data message or control signaling transmitted by the indication information. The data message or control signaling may include at least one: channel state information; and information associated with retransmission.

In one embodiment, the processing module 710 may be configured to determine, in response to the data message or control signaling indicating that the number of retransmissions is insufficient (e.g., less than a threshold) or a time slot edge is encountered, that a retransmission needs to be continued. In one embodiment, the processing module 710 may be configured to determine, in response to the data message or control signaling indicating that the number of retransmissions is sufficient (e.g., the threshold is reached or can be decoded correctly), that the retransmissions need to be terminated early.

The communication device 700 shown in FIG. 7 is only exemplary, and embodiments of the present disclosure are not limited thereto; for example the communication device 700 may also include more modules to perform additional operations, or may combine fewer modules to perform various operations.

The communication device provided by the embodiments of the present disclosure can perform adaptive sparse transmission in the frequency domain and use the indication information for retransmission or transmission of other important information, which can effectively use the spectrum resources and ensure the reliability of transmission.

Based on the same principles as the methods provided by the embodiments of the present disclosure, the embodiments of the present disclosure also provide an electronic device including a processor and a memory. The memory stores machine readable instructions which may also be referred to as a "computer program". The processor is configured to execute the machine readable instructions to implement the methods described with reference to FIG. 1 to FIG. 5.

The embodiments of the present disclosure also provide a computer-readable storage medium having a computer program stored thereon, where the computer program, when executed by a processor, causes the processor to implement the methods described with reference to FIG. 1 to FIG. 5.

In some embodiments, the processor may be configured to implement or execute various exemplary logic boxes, modules and circuits described in conjunction with the present disclosure, for example, a Central Processing Unit (CPU), a general purpose processor, a Digital Signal Processor (DSP), an Application Specific Integrated Circuit (ASIC), a Field Programmable Gate Array (FPGA), or other programmable logic device, a transistorized logic device, a hardware component, or any combination thereof. The processor can also be combinations that implement computing functions, such as combinations containing one or more microprocessors, combinations of DSPs and microprocessors, etc.

In some embodiments, the memory may be, for example, Read Only Memory (ROM), Random Access Memory (RAM), Electrically Erasable Programmable Read Only Memory (EEPROM), Compact Disc Read Only Memory (CD-ROM), or other optical disc storage, CD ROM storage (including compact discs, laser discs, optical discs, digital universal discs, Blu-ray discs, etc.), disk storage media or other magnetic storage devices, or program code capable of being carried or stored in the form of instructions or data structures and any other medium that can be accessed by a computer, without limitation.

It will be understood that although the individual steps in the flowchart of the accompanying drawings are shown sequentially as indicated by the arrows, the steps are not necessarily performed sequentially in the order indicated by the arrows. Except as expressly stated herein, there is no strict sequential limitation on the execution of these steps, which may be performed in any other order. In addition, at least some of the steps in the flowchart of the accompanying drawings may include a plurality of sub steps or a plurality of phases, which are not necessarily executed at the same moment of completion, but may be executed at different moments, and the order of their execution is not necessarily sequential, but may be executed in rotation or alternately with other steps or at least some of the sub steps or phases of other steps.

In addition, the technical solutions in the embodiments of the present disclosure can be combined with each other in any combination without conflict.

Other embodiments of the application will be readily apparent to those skilled in the art from consideration of the specification and practice of the application disclosed herein. This disclosure is intended to cover any modification, use or adaptation of the present application, these modifications, uses or adaptations follow the general principles of the present application and include common knowledge or conventional technical means in the field not disclosed in this disclosure. The specification and embodiments are to be considered exemplary only, with a true scope and spirit of the application being indicated by the following claims.

It will be understood that the present application is not limited to the precise construction already described above and illustrated in the accompanying drawings, and that various modifications and changes may be made without departing from its scope. The scope of the present application is limited only by the appended claims.

What is claimed is:

1. A communication method, comprising:

performing, based on an index modulation mode, index modulation on indication information to be sent, by a location of a resource occupied by constellation symbol information in a transmission block, to generate modulated transmission information, wherein the modulated transmission information comprises the constellation symbol information and the indication information, the index modulation mode comprises:

an occupancy rule for the location of the resource in the transmission block, wherein the occupancy rule for the location of the resource in the transmission block provides a number of resources randomly selected for transmission of the constellation symbol information from a total number of resources contained in at least one transmission block; and performing, in response to determining that a number of bits of the indication information is greater than a number of bits of the constellation symbol information, retransmission on the constellation symbol information using a first portion of the bits of the indication information, and carrying a check bit for the location of the resource using a second portion of the bits of the indication information.

2. The method of claim 1, wherein the index modulation mode is adaptively determined based on a quality condition of a communication with a receiver.

3. The method of claim 2, wherein the index modulation mode is adaptively determined based on a measurement parameter of the quality condition of the communication with the receiver, and the measurement parameter comprises at least one of followings: reference signal receiving power (RSRP), reference signal receiving quality (RSRQ), or signal to interference plus noise ratio (SINR).

4. The method of claim 1, wherein the index modulation mode is notified to a receiver via Physical Downlink Control Channel (PDCCH) or Physical Uplink Control Channel (PUCCH).

5. The method of claim 4, wherein the PDCCH or the PUCCH carries bit information related to the index modulation mode, wherein a quantity of the bit information is determined based on a number of resources in the transmission block.

6. The method of claim 1, further comprising at least one of following steps:

sending the modulated transmission information; or selecting a transmission resource scheduling level, wherein the transmission resource scheduling level that is selected corresponds to granularity or dimensionality of a division of resources contained in each transmission block.

7. The method of claim 1, wherein the resource comprises one of followings: a subcarrier, a symbol, a resource block (RB), or a resource element (RE).

8. The method of claim 1, wherein the indication information comprises index bit information consisting of one or more bits.

9. The method of claim 1, wherein the indication information is used to transmit a data message or control signaling.

10. A non-transitory computer-readable storage medium, having a computer program stored thereon, wherein the computer program, when executed by a processor, causes the processor to implement the method of claim 1.

11. The method of claim 1, wherein the indication information is used to transmit the data message or control signaling in response to determining that the number of bits of the indication information is less than the number of bits of the constellation symbol information, or the indication information is used to transmit the data message or control signaling in response to determining that the number of bits of the indication information is less than the number of bits of the constellation symbol information, and the data message or control signaling comprises at least one of following information: channel state information; or information associated with retransmission.

12. The method of claim 1, wherein the index modulation mode further comprises: a mapping relationship between the location of the resource occupied by the constellation symbol information in the transmission block and corresponding indication information, wherein the mapping relationship reflects a correspondence of the indication information to the location of the resource occupied by the constellation symbol information in the transmission block.

13. A communication method, comprising:

receiving modulated transmission information from a transmitter, wherein the modulated transmission information comprises constellation symbol information and indication information;

obtaining, based on an index modulation mode, the indication information from the modulated transmission information, according to a location of a resource occupied by the constellation symbol information in a transmission block, the index modulation mode comprises:

an occupancy rule for the location of the resource in the transmission block, wherein the occupancy rule for the location of the resource in the transmission block provides a number of resources randomly selected for transmission of the constellation symbol information from a total number of resources contained in at least one transmission block; and determining, in response to determining that a number of bits of the indication information is greater than a number of bits of the constellation symbol information, that a first portion of the bits of the indication information corresponds to a retransmission content of the constellation symbol information, and performing a check on the location of the resource using a second portion of the bits of the indication information.

14. The method of claim 13, wherein the index modulation mode is adaptively determined based on a quality condition of a communication with the transmitter.

15. The method of claim 13, wherein the index modulation mode is obtained from the transmitter via Physical Downlink Control Channel (PDCCH) or Physical Uplink Control Channel (PUCCH).

16. The method of claim 13, further comprising:

selecting a transmission resource scheduling level, wherein the selected transmission resource scheduling level corresponds to granularity or dimensionality of a division of resources contained in each transmission block.

17. The method of claim 13, the resource comprises one of followings: a subcarrier, a symbol, a resource block (RB), or a resource element (RE).

18. An electronic device, comprising a memory, a processor and a computer program stored on the memory and runnable on the processor, wherein the processor, when executing the computer program, implements following acts:

performing, based on an index modulation mode, index modulation on indication information to be sent, by a location of a resource occupied by constellation symbol information in a transmission block, to generate modulated transmission information, wherein the modulated transmission information comprises the constellation symbol information and the indication information, the index modulation mode comprises:

an occupancy rule for the location of the resource in the transmission block, wherein the occupancy rule for the location of the resource in the transmission block provides a number of resources randomly selected for transmission of the constellation symbol information from a total number of resources contained in at least one transmission block; and performing, in response to determining that a number of bits of the indication information is greater than a number of bits of the constellation symbol information, retransmission on the constellation symbol information using a first portion of the bits of the indication information, and carrying a check bit for the location of the resource using a second portion of the bits of the indication information.

* * * * *